United States Patent [15] 3,656,742
Michels [45] Apr. 18, 1972

[54] DOCUMENT TRANSPORT DEVICE

[72] Inventor: Heinz-Gunter Michels, Berlin, Germany

[73] Assignee: The National Cash Register Company, Dayton, Ohio

[22] Filed: July 29, 1970

[21] Appl. No.: 59,090

[30] Foreign Application Priority Data

Aug. 1, 1969 Germany.......................P 19 39 129.8

[52] U.S. Cl.............................................271/3, 271/DIG. 9
[51] Int. Cl...........................................................B65h 5/06
[58] Field of Search.......................271/3, 4, 6, 7, 10, DIG. 9

[56] References Cited

UNITED STATES PATENTS 2,017,191 10/1935 Whelan.....................................271/3
3,218,060 11/1965 Harbison..................................271/4
3,337,213 8/1967 La Barre...................................271/3

*Primary Examiner*—Joseph Wegbreit
*Attorney*—Louis A. Kline, Wilbert Hawk, Jr. and George J. Muckenthaler

[57] ABSTRACT

A single, double-function, pressure platen, movable by actuating mechanism from a home position to two different operative positions for transporting record material in successive fashion. The platen is positioned to cooperate with a first, constantly driven, platen to transport the record material from a stack to a processing station and then to cooperate with a second, constantly driven, platen to transport the material from the processing station to a collection station.

14 Claims, 4 Drawing Figures

PATENTED APR 18 1972 3,656,742

SHEET 1 OF 2

INVENTOR
HEINZ-GÜNTER MICHELS
BY Louis A. Kline
Wilbert Hawk, Jr.
Geo. J. Muckenthaler
HIS ATTORNEYS INVENTOR
HEINZ-GÜNTER MICHELS
BY Louis A Kline
Wilbert Hawk, Jr.
Geo. J. Muckenthaler
HIS ATTORNEYS

DOCUMENT TRANSPORT DEVICE

BACKGROUND OF THE INVENTION

There has become known a large number of data carrier and record material transport devices. In such devices, however, it has always been difficult to transport the data carriers or record material in a simple, safe, and fast manner, without damaging them, from the stack to the processing station where they have to be placed properly for being worked upon and then transported to a further station for collection.

The ever-increasing importance of ON LINE data carrier processing (i. e., the use of original documents carrying machine-readable or optically readable data; e. g., bank checks, as data carriers) requires the provision of suitable record material printers in which the data carriers have to be transported in the above-mentioned manner and the data, readable by both machine and the human eye, have to be printed thereon.

Thus, in record material printers of this type the material transport is an important function. The record material is automatically taken from a stack on a command — for example, by key depression — and is fed to the printing station of the record printer, where the checks are provided, in a predetermined printing line, with one and/or more encoding imprints enabling them to be processed automatically.

In this connection, an important requirement, among other things, consists in that the record material, automatically fed to the printing station and adjusted therein properly for being printed upon, shall be freely visible to the operator in order that the latter can easily read those data from the record material, which data are then entered into the machine via the keyboard and are applied to the checks as an encoding imprint. It is, therefore, desirable that the visibility of the data of the record material be not impeded by any transport members whatsoever. Accordingly, the data carrier or record material should freely lie in the processing station.

Known prior art considered as relating to the present invention includes U.S. Pat. No. 3,411,768, issued Nov. 19, 1968, on the application of Giancarlo Gatti, which discloses a high-speed device for feeding data-carrying documents comprising separating means for removing documents from a stack, one by one, feeding the documents alternately through one of two paths to an aligning means and stopping member, and then changing the direction of movement of the document. Additionally, U.S. Pat. No. 3,473,799, issued Oct. 21, 1969, on the application of Emilio M. Binzoni, Robert E. Mersereau, and Donald L. Wilson, shows document-handling apparatus including a pair of belts or tapes for feeding individual articles such as sheets or documents to a printing station, stopping the article at the printing station for a controlled period of time, and carrying it away from the printing station to a receiving tray.

SUMMARY OF THE INVENTION

The present invention relates to transport devices and more particularly to data carrier or document transport devices wherein the documents are selectively taken or removed from a stack by a singulating element and, by means of transport platens, are moved to a processing station, where they are processed and then moved to a collecting station.

The device includes separating rollers for singularly displacing documents from a stack and along a path for transporting by a rockable pressure platen in cooperation with a constantly driven platen to a processing station where matter is printed or encoded on the document. At the time of printing or encoding, the document is positioned for viewing by the operator of the device to read certain indicia and to ascertain whether the printing or encoding is correctly placed thereon.

After the printing operation, the document is removed from the printing station by means of the above-mentioned rockable pressure platen cooperating with a further constantly driven platen to then transport the document to a collecting station. The final transporting of the document to the collecting station is accomplished by means of another pressure platen cooperating with the first-mentioned constantly driven platen. The rockable pressure platen is carried on an arm-bearing gear member engageable with a toothed segment which rocks from a home position in a to-and-fro path for directing movement of the documents. The rockable pressure platen thus performs a dual function in the transportation of the documents from the stack or magazine to the printing station and then to the collecting station.

In accordance with the above discussion, it is the principal object of the present invention to provide a data carrier or document transport device in which the data carriers can be transported in a simple, fast, and safe manner from a stack to a processing station and from there to a collecting station.

A further object of the present invention is to provide a rockable pressure platen for performing a dual function in the transportation of the documents.

An additional object of the present invention is to provide a simple mechanism for placing documents into position for printing thereon and for permitting immediate observation of the printed matter.

Additional advantages and features of the present invention will become apparent and fully understood from a reading of the following description taken together with the annexed drawings, in which:

FIG. 1, on the sheet with FIG. 4, is a perspective view, in diagrammatic form, of a business machine which incorporates the present invention;

Figure 1:
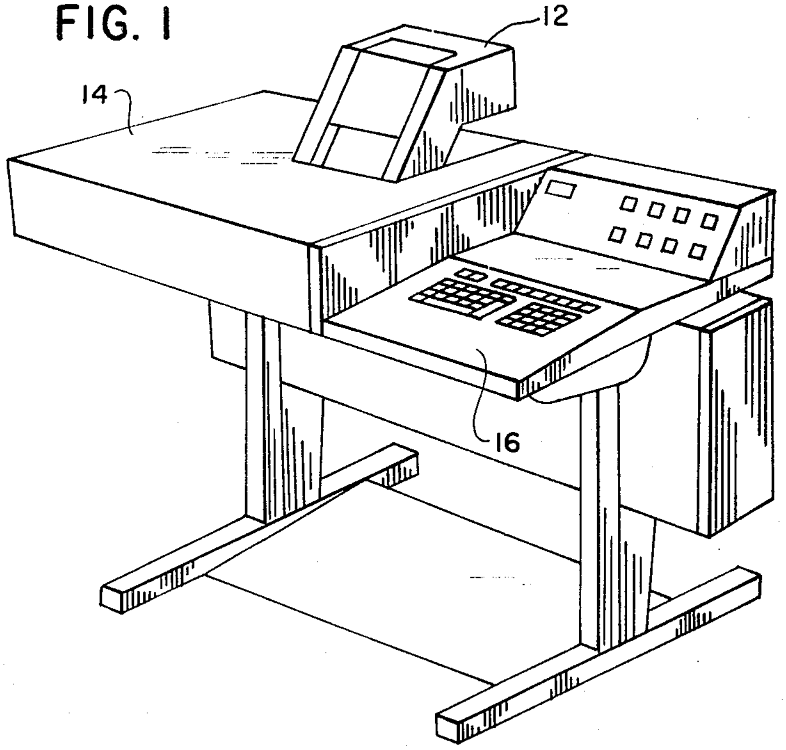

Referring to FIG. 1, there is shown a business machine of the printing or encoding type having, as its main parts, a document-handling mechanism 12, an enclosure 14 for containing drive and processing mechanism, and a keyboard 16. The parts of the machine may be supported on a frame and legs as shown, or they may be counter- or desk-supported, and may include additional mechanism and devices for processing of data therethrough. Suffice it to say that the subject matter of the present invention could be utilized in various types of business machines where it is desired to transport documents to at least two functional stations without duplication of the transport mechanism.

Figures 2, 3:
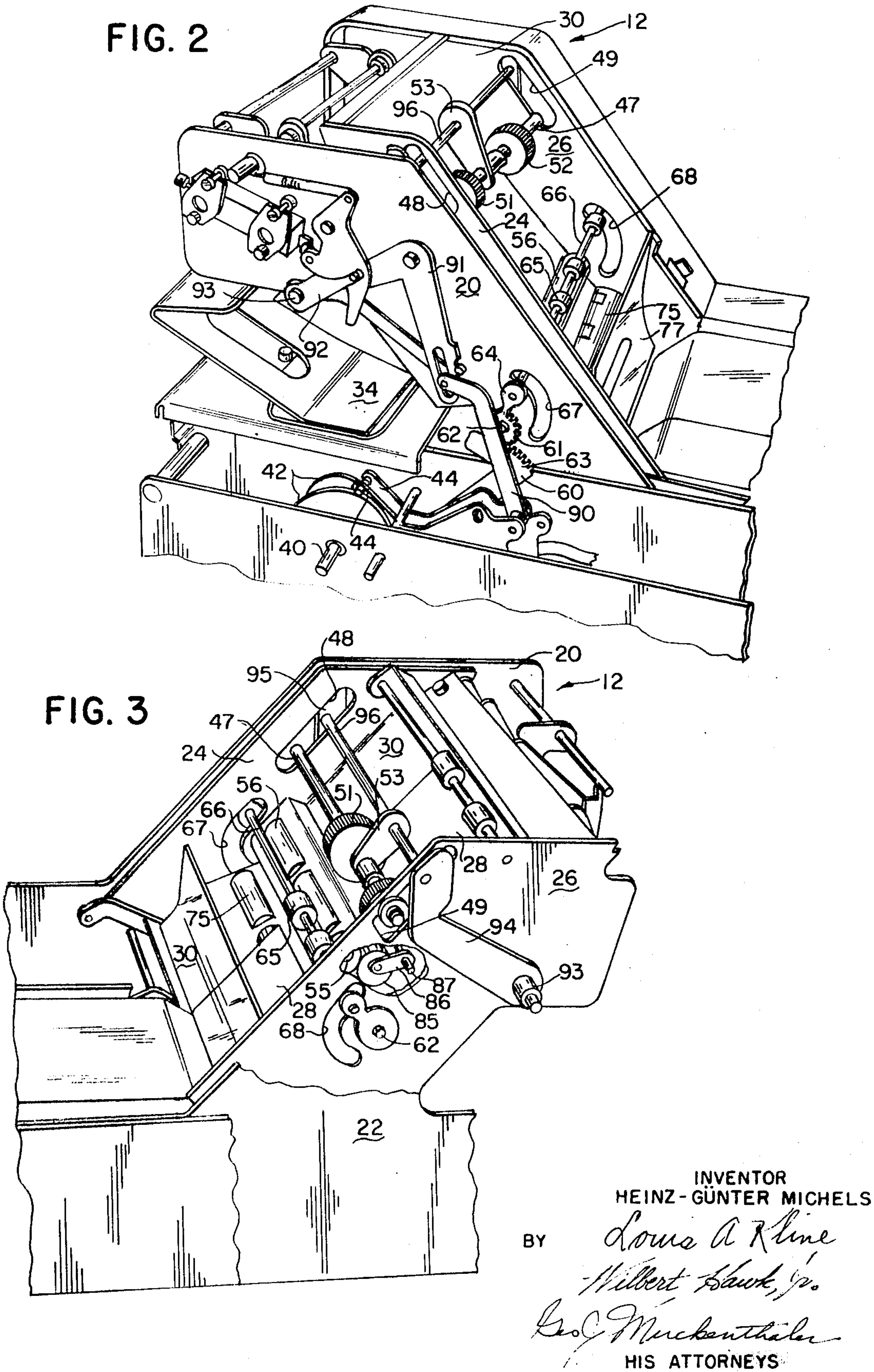
FIG. 2 is an enlarged perspective view, taken from the left-hand side, showing certain parts of the machine.
FIG. 3 is a perspective view, taken from the right-hand side, showing parts of the same machine.

As seen in the enlarged perspective views (FIGS. 2 and 3), the document transport mechanism is carried generally between outside frame plates 20 and 22, there being inside frame plates 24 and 26 spaced from the outside plates. The inside plates contain apertures, slots, etc., for certain of the shafts and other like elements to operate therein, and, likewise, the outside plates have apertures, slots, hubs, and the like for a similar purpose. The document transport mechanism carries the documents 28 from a magazine 30 to a processing or printing station 32 and then to a collecting station 34, the documents traveling in singular fashion along a path defined by the position of various platens and rollers.

A drive shaft 40 provides rotary motion to the various parts of the transport mechanism, and the shaft 40 carries cams 42 cooperating with followers 44 for initiating a reciprocating or oscillating motion for use by the dual function platen of the instant invention. The magazine 30 contains a stack of documents biased in one direction by suitable resilient means (not shown), so that the top, or upper, document is always ready to be singularly removed from the stack at commencement of the transport operation. Rotatably carried on a shaft 47 movable in slots 48 and 49 in the side plates 24 and 26 are two rollers 51 and 52, which are positioned to move the top document from the stack by reason of their weight thereon, by coupling means within the rollers and by a driving arm 53 connected to the shaft 47. Each of the rollers 51, 52 is provided with a spring coupling of known type cooperating with the shaft 47 and working with a free-wheeling effect whereby the arrangement causes the rollers to be blocked against rotary movement on the shaft in one direction, while they are free to rotate in the other direction.

Downward from the magazine 30 is a first continuously driven shaft 55 (FIG. 3) having a transport platen 56 thereon, the shaft being suitably journaled in the side plates and the platen being in position for engaging with the top document 28 as it is moved from the magazine 30. Connected to the followers 44 is a toothed segment 60 (FIG. 2) capable of being rocked first in one direction and then in the other direction a limited portion of a circle, so as to swing the dual function platen ( to be described) approximately 120°. A rotatable gear 61, journaled on a stub shaft 62, engages and is in constant mesh with the teeth 63 of the segment 60, the gear running along the arc of the segment as the segment is moved along a path initiated by motion of the followers 44. A platen arm 64 is fixed to the stub shaft 62, and the arm 64 carries a pressure platen 65 on a shaft 66 extending between the side plates and movable along arcuate slots 67 and 68 therein.

Downward from the segment 60 and the gear 61 is a further continuously rotating platen 75, which is carried on a shaft also extending between the side plates, the platen 75 being positioned adjacent a chute 77 at the printing station 32. The chute 77 positions the document in a manner for printing or encoding thereon and additionally contains the document for ready observation of the printed matter by the operator.

A third continuously rotating platen 85 (FIG. 3) is positioned adjacent the first platen 56 and is carried on a shaft swingable on an arm 86 toward and away from the platen 56, the arm being secured to a cross shaft 87, and the platen 85 normally rotating in the direction opposite from that of the platen 56.

Connected to the followers 44 is a link 90, which, in turn, is slidably connected to a bellcrank arm 91, which is pivoted to the frame of the machine, the crank 91 extending upwardly to a driving arm 92. This link, crank, and arm arrangement permits motion of the followers 44 to be transmitted in the form of a back-and-forth planar motion to the shaft 47 and enables the rollers 51 and 52 to move the top document off the stack toward the first rotating platen 56 and the pressure platen 65 for transporting the document to the printing station. The driving arm 92 is secured to a cross shaft 93 extending between the side plates, the shaft 93 carrying arms 94 and 95 (FIG. 3) pivoted to a shaft 96, in turn connected to the driving arm 53 for moving the shaft 47 and the rollers 51, 52 in back-and-forth travel.

Figure 4:
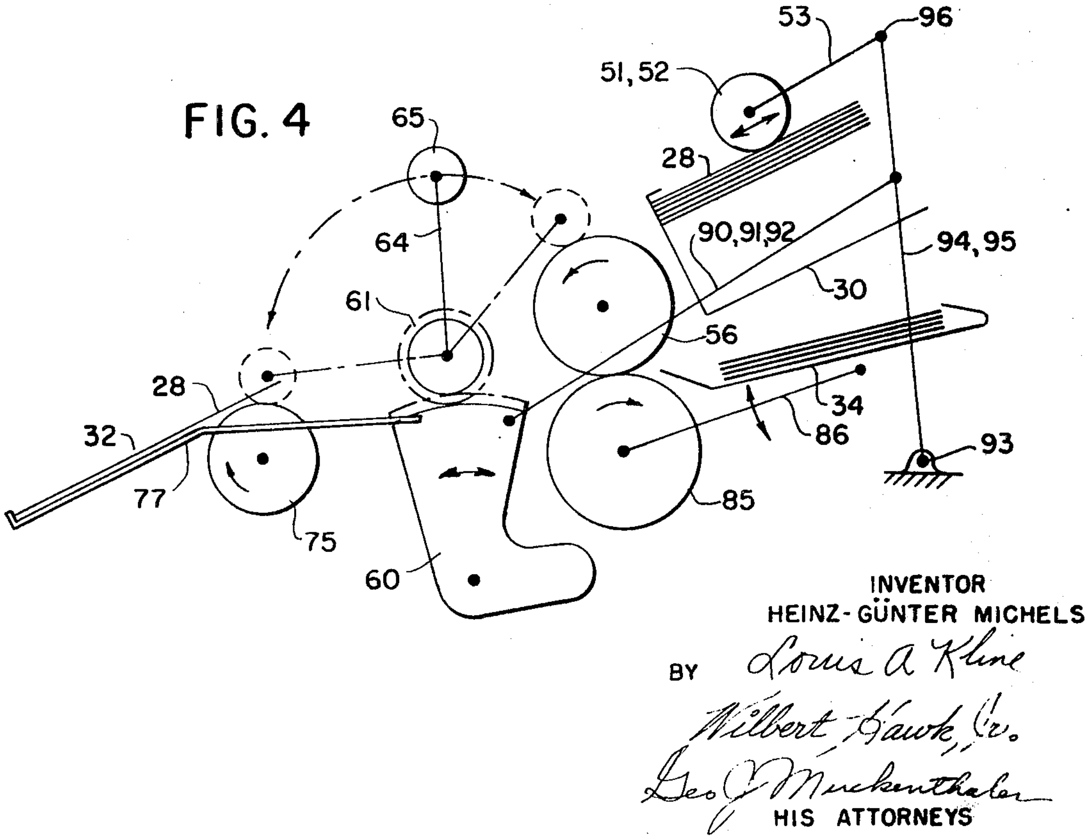
FIG. 4, on the sheet with FIG. 1, is a schematic representation of the document transport mechanism.

In the operation of the device, and referring to FIG. 4 for a schematic showing thereof, and with the magazine 30 containing a plurality of documents 28, a transport control key on the keyboard 16 is depressed to start the transport mechanism in motion. The oscillating or rocking movement of the toothed segment 60 is derived from the cams 42 on the drive shaft 40, the followers 44, and the interconnecting linkage between the follower arms and the segment. As viewed from the right-hand side shown in FIG. 4, and assuming that the pressure platen 65 is in its home position, as indicated in solid lines, the segment 60 rotates to the right, or clockwise, which rotates the gear 61 counter-clockwise and swings the pressure platen 65 toward the continuously rotating platen 75 adjacent the printing station 32. If the printing station contains a document 28, its edge, freely projecting beyond the edge of the chute 77, will be contacted by the pressure platen 65 and urged against the transport platen 75 rotating clockwise. This causes the document at the station to be moved therefrom and towards the collecting station 34 in the direction of the rotating transport platen 56 located adjacent the magazine 30. This movement of the pressure platen 65 simultaneously causes the rotating transport platen 85 to be moved form its lower position toward the platen 56 to contact the moving document and carry it to the collecting station 34.

When the segment 60 is rocked clockwise, the rollers 51, 52 (under control of the intermediate members 90, 91, 92, 93, 94, 95, 96, and 53) perform a generally upward movement causing them to leave their home position. This upward movement has no working effect on the rollers 51, 52, as, by reason of the spring couplings, the rollers merely ride on the top document to a ready-to-feed position.

Subsequent counter-clockwise rocking of the segment 60 then causes the pressure platen 65 to be rocked clockwise toward the transport platen 56 by the gear 61 and the arm 64, and causes the rollers 51, 52 to be moved downwardly in a document-feeding direction. The rollers cause the top document to be individually fed from the stack in the magazine 30, by reason of the linkage connecting the segment 60 and the rollers 51, 52 performing this downward movement of the rollers while the rollers are in contact with the top document of the stack. By reason of small retaining members at the lower edge of the magazine, the top document 28 is somewhat impeded in its initial travel until the rollers move the document sufficiently to bow the leading edge slightly, and, on further movement, the bowed portion slips over the retaining members acting on the lower edge. The document then is moved out to the position to be engaged by the platen 56. Precisely at this time, the pressure platen 65 swings against the document which is in contact with the platen 56, and, by reason of the counter-clockwise-rotating platen 56 and the urging by the platen 65, the document is carried downwardly to the processing or printing station. Additional printing or encoding is performed in suitable manner by conventional means while the document 28 is held in the station chute 77 in position for ready observation by the operator. Meanwhile, the platen 65 has swung counter-clockwise to a mid, or home, position, ready for the next function, which is to move the document from the processing station.

At this time, the platen 65 swings counter-clockwise due to the segment 60 rotating clockwise, thus causing the gear 61 to rotate clockwise to swing the platen 65 toward the platen 75. At the same time, the linkages between the segment 60 and the rollers 51, 52 are moved to pull the rollers upwardly across the top document, the rollers being free to rotate clockwise by reason of the spring coupling allowing the free-wheeling effect. The rollers are now in position for advancing the next document.

When the platen 65 is swung against the edge of the document 28 at the printing station 32, pressure is exerted on the document and on the clockwise-rotating platen 75 to cause the document to move from the processing station 32 to the collecting station 34 located downwardly from the magazine 30. As the document is moved toward the station 34, the rotating platen 85 is moved toward the path of the document and into contact with the first platen 56. The document is then carried along this path between the platens 56 and 85, and, by reason of the opposite rotation of these platens, the document is transported into the collecting station tray. Meanwhile, the segment 60 has returned the pressure platen to the home position and also moved the rollers 51, 52 into contact with the top document for the next operation.

It is thus seen that herein shown and described is a document transport mechanism utilizing a rockable pressure platen arranged so that the platen performs a dual function in an advantageous manner by causing, in a first operative position, cooperation with a first rotating platen to move a document from a stack to a processing station, and, in a second operative position, cooperation with a second rotating platen to move the document from the processing station to a collecting station. Thus, document insweep and deposition are performed by a single pressure platen. Although the swingable rotating platen 85 cooperating with the transport platen 56 to finally advance the document into the collecting station 34 is shown and described as a part of the transport mechanism, it is possible that the distance from the processing station 32 to the collecting station 34 could be minimized, so that the efforts of the platens 65 and 75 would be sufficient to carry the document across this distance. Additionally, the platen in its home, or mid, position allows ready observation of the printing on the document when at the processing station. While only one embodiment has been disclosed for the construction and operation of the transport mechanism, certain variations on the above may occur to those skilled in the art, so it is contemplated that all such variations having these features are within the scope of the invention.

What is claimed is:

1. A transport device for moving documents to multiple stations in a machine having a document supply station, comprising means at the supply station for initiating movement of a document, a first rotating platen adjacent the supply station for receiving the document, means rockable into engagement with the first rotating platen for advancing the document therepast to a second station, and a second rotating platen adjacent the second station for receiving the document therefrom, said rockable means being swingable into engagement with the second rotating platen for transporting the document therepast in a path toward a third station.

2. The transport device of claim 1 including a third rotating platen adjacent and engageable with the first rotating platen for advancing the document to the third station.

3. The transport device of claim 1 wherein the rockable means comprises a pressure platen swingable in oscillating manner in a path between the first and the second rotating platens.

4. The transport device of claim 1 wherein the rockable means includes a segment, means for driving the segment in oscillating manner, and a platen member connected with the segment and engageable with the first and the second rotating platens in successive manner in response to oscillation of the segment.

5. A transport device for moving documents from a supply station to a processing station and further to a collecting station, comprising means for moving documents from the supply station in singular fashion, a first rotating platen adjacent the supply station for receiving a document, a pressure platen carried parallel to the first rotating platen, means for swinging the pressure platen in an arcuate path into engagement with the first rotating platen for moving the document therepast and to the processing station, and a second rotating platen adjacent the processing station for receiving the processed document, the pressure platen being swingable in the arcuate path into engagement with the second rotating platen for moving the document therepast and in the direction of the collecting station.

6. The transport device of claim 5 including a third rotating platen adjacent and engageable with the first rotating platen for advancing the document to the collecting station.

7. The transport device of claim 5 wherein the means for swinging the pressure platen includes a toothed segment, means for driving the segment in oscillating manner, and a rotatable member engaged with the segment and connected with the pressure platen for swinging the platen along the arcuate path in successive engagement with the first and the second rotating platens.

8. The transport device of claim 7 including a linkage connected to the segment and to the means for moving documents in singular fashion for automatically moving a document from the supply station in response to oscillation of the segment.

9. In a business machine, document transport mechanism for moving documents from a supply station to a processing station and then to a collecting station, the mechanism comprising means at the supply station for moving the documents in singular fashion therefrom, a first rotating platen adjacent the supply station for receiving a document, a second rotating platen adjacent the processing station for receiving the processed document, and means rockable in one direction into engagement with the document upon receipt thereof by the first rotating platen for transporting the document to the processing station and then rockable in the other direction into engagement with the processed document upon receipt thereof by the second rotating platen for transporting the document toward the collecting station.

10. In the business machine of claim 9 including a third rotating platen adjacent and engageable with the first rotating platen for transporting the processed document to the collecting station.

11. In the business machine of claim 9 wherein the rockable means includes a toothed segment, means for driving the segment in oscillating manner, and means connected with the segment and engageable with the first and second rotating platens in successive fashion in response to the oscillating drive means.

12. In the business machine of claim 11 wherein the means engageable with the first and second rotating means is a pressure platen swingable in an arcuate path in response to oscillation of the segment.

13. In the business machine of claim 12 including a rockable gear engaged with the toothed segment and connected for carrying the pressure platen in the path between the first and second rotating platens.

14. In the business machine of claim 11 including a linkage connected to the segment and to the singular document moving means for automatically advancing a document from the supply station to the processing station at the time a document is advanced from the processing station to the collecting station.

* * * * *